No. 820,733. PATENTED MAY 15, 1906.
J. POST.
STREET RAILWAY CAR FENDER.
APPLICATION FILED NOV. 29, 1905.
2 SHEETS—SHEET 1.
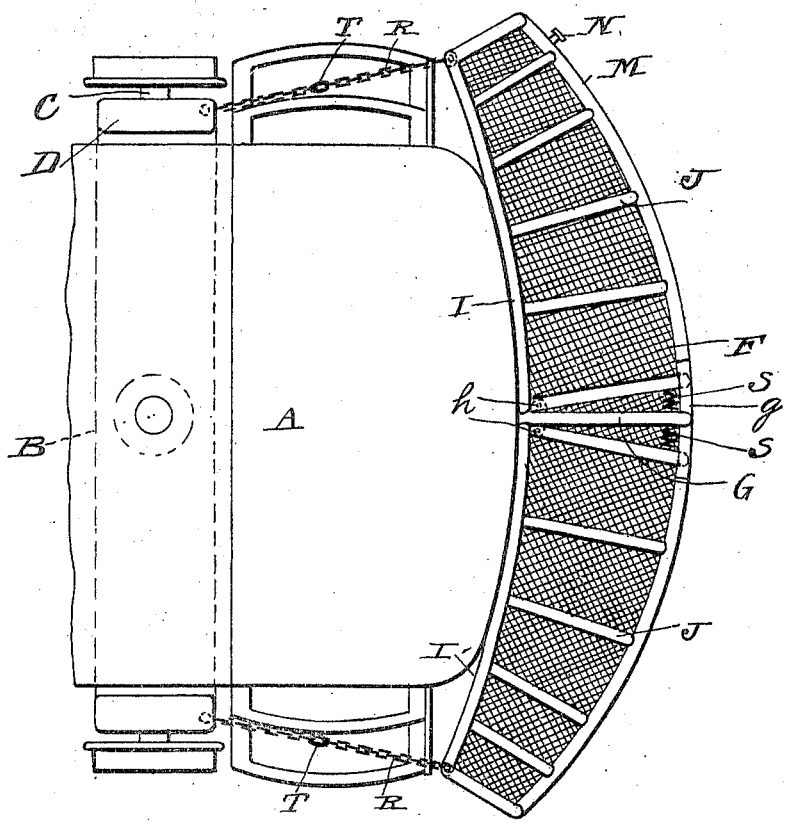
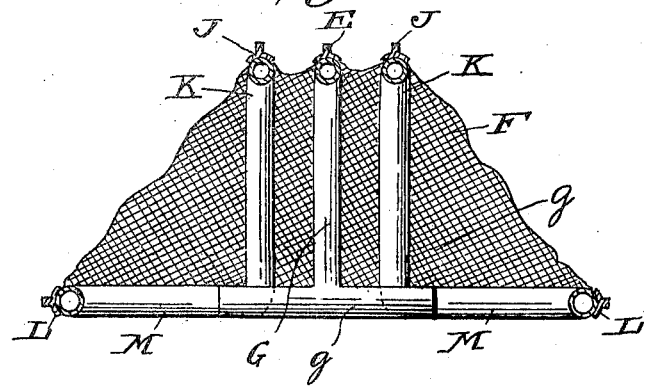
Witnesses
Jos. H. Blackwood
James K. Polk
Inventor
John Post

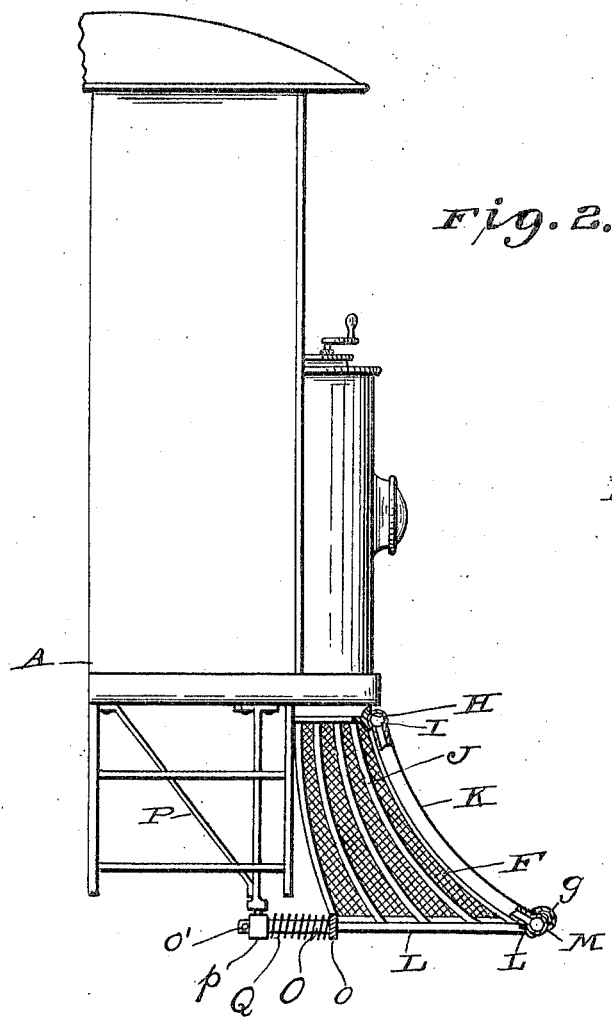

UNITED STATES PATENT OFFICE.

JOHN POST, OF PHILADELPHIA, PENNSYLVANIA.

STREET-RAILWAY-CAR FENDER.

No. 820,733.	Specification of Letters Patent.	Patented May 15, 1906.

Application filed November 29, 1905. Serial No. 289,702.

*To all whom it may concern:*

Be it known that I, JOHN POST, a citizen of the United States, and a resident of Philadelphia, in the county of Philadelphia and State of Pennsylvania, have invented new and useful Improvements in Street-Railway-Car Fenders, of which the following is a specification.

My invention relates to fenders for street-railway cars, and has for one of its objects the provision of a fender made up of a steel frame covered with inflatable rubber tubing, said tubing forming a cushion to break the force of impact in striking an object on the track.
Another feature of the invention consists in mounting the lower portion of the fender-frame so that it will give as a unit when contacting with an object on the track, contributing, with the inflated tubing above described, to diminish the jar to said object, as well as to the car carrying the fender.

Still another feature of the invention consists in forming the fender of two independently-pivoted sections, each of which is connected with the adjacent wheeled truck, so that in rounding curves the section of the fender on the inner side of the curve is drawn around to cover the track on the said inner side of the curve and prevent an object from being struck by the platform-steps or wheels on that side of the car, springs being provided to return the sections to their normal positions when the car runs onto the straight track again.
My invention will be described in detail hereinafter and illustrated in the accompanying drawings, in which—

Figure 1 is a plan view of my improved fender, showing it attached to the platform of a car; Fig. 2, a side view of the car-platform, showing the fender partly in section; Fig. 3, a detail showing one of the upright ribs and the central bar in section and the tube in position; and Fig. 4, a view of a fragment of the middle of the fender looking at it from the front and from underneath, showing the springs for holding the sections of the fender in their normal positions.

In the drawings similar reference characters indicate corresponding parts throughout the several views.

A represents the platform of a street-car; B the truck adjacent thereto, on which is journaled the axle C in suitable boxes D.

E represents a metal bar secured to the middle of the forward end of the platform and extending downward and forward from the said platform. Bar E is formed concavo-convex or channeled in cross-section and has secured thereto the middle of a piece of hemp or other flexible netting F, and over the netting a tube G, of inflatable material, such as rubber, is provided, having at its lower end a cross-tube g, having its under surface formed concave for the purpose hereinafter stated. The fender proper is formed in two sections, each having a channeled bar H pivotally secured to the upper end of bar E by means of hinges h of any suitable construction. The upper edge of the netting F is secured to said bar, and over the netting an inflatable tube I is secured and connected with tube G for the purpose of simultaneous inflation. Secured to each bar H are ribs J, of channeled metal, over which are stretched the netting F, and over the netting are secured inflatable tubes K, connected with the tubes I for simultaneous inflation. In arranging the netting F care must be taken to leave a sufficient fullness between the bar E and the rib J adjacent to the bar, so that when the sections are swung, as will be hereinafter described, the fullness of the netting between said bar E and ribs J will cover the spaces between said bar and ribs. L represents horizontal channeled bars secured to the lower end of the ribs J, to which is secured the lower edge of the netting F and also inflatable tubes M, connected with tubes K for simultaneous inflation. By connecting all of the tubes—viz., G, I, K, and M—together, as described, it will be understood that they will be simultaneously inflated by means of a pump or other inflating means (not shown) secured to a tap N at the end of one of the tubes M or at any other selected position. It will be understood that this construction of metal frame covered with inflatable tubing forms a fender with a cushion-surface that breaks the force of contact with any foreign body that may be on the track and, together with the additional structure to be described hereinafter, provides a device that will prevent seriously injuring a living object that may be in the way of the car and prevents the jar incident to the compact from injuring or derailing the car. O represents a horizontal bar secured to each bar L and having their free ends slidably mounted in tubular bearings $p$, which bearings are swively secured to the lower ends of brackets P, said brackets being secured to the under side of the platform A. The tubular bearings $p$ are swively connected to said brackets in order to permit the sidewise movement of the horizontal bars and bearings when the fender-section is operated, as hereinafter described. Q represents a coil-spring on bar O and bearing against a collar $o$ on said bar and said tubular bearing $p$. $o'$ represents a pin in the end of each of the bars O to limit the forward movement thereof under impulse of spring Q. This construction permits the lower bar L of each section of the fender to swing backward when an obstruction is encountered, so that undue injury to the object encountered and to the car is prevented, it being understood that the ribs J are sufficiently flexible to permit this action of the fender.

R represents a chain secured to the outer end of each section of the fender and to the corresponding end of the adjacent truck G, and S retractile coil-springs secured to the inner ends of bars L and the lower end of bar E. Chain R is provided with turnbuckles to permit the adjustment of the chain as may be desired. By this structure it will be understood that when the car rounds a curve the swinging of the truck will draw the end of the fender on the inside of the curve around, so as to cover the track on the inside of the curve and prevent the platform-steps and wheels on that side of the car from striking any object on that side of the track. After the front of the car has passed the curve and run onto the straight track the springs Q and S return the section of the fender to its original position.

It will be understood that during the operation of turning when the inside of the fender is drawn around in front of the car and the steps and wheels thereof the fullness of the netting between the central rod and the adjacent rib on the inside of the car will permit the fender-section to be drawn around, and at the same time the inflatable tubing G on the central rod E, with its right-angle extension $g$ at the lower portion thereof, will completely cover the space left by the withdrawal of the fender-section during the operation of turning, forming a complete fender for the car at all times.

Having thus described my invention, what I claim is—

1. A car-fender having its surface composed of inflatable cushions connected together for simultaneous inflation, substantially as shown and described.

2. A car-fender having its contacting surface composed of inflated tubing, substantially as shown and described.

3. A car-fender having its surface composed of inflatable tubing connected together for simultaneous inflation, substantially as shown and described.

4. A car-fender composed of horizontal bars, ribs connecting said horizontal bars, and inflatable tubing secured to said bars and ribs, substantially as shown and described.

5. A car-fender comprising horizontal bars, ribs secured to said bars, said bars and ribs being longitudinally channeled, and inflatable tubing secured in the channeled portion of said bars and ribs, substantially as shown and described.

6. A car-fender comprising horizontal bars, ribs secured to said bars, and inflatable tubing secured to said bars and ribs, said tubing being connected together for simultaneous inflation, substantially as shown and described.

7. A car-fender comprising horizontal bars, ribs secured to said bars, said bars and ribs being longitudinally channeled, and inflatable tubing secured to said bars and ribs, said tubing being connected together for simultaneous inflation, substantially as shown and described.

8. A car-fender comprising horizontal bars, ribs secured to said bars, a netting of flexible material secured to said ribs, and inflatable tubing secured to said bars and ribs, substantially as shown and described.

9. A car-fender comprising horizontal bars, ribs secured to said bars, a netting of flexible material secured to said ribs, and inflatable tubing secured to said bars and ribs, said tubing being connected together for simultaneous inflation, substantially as shown and described.

10. A car-fender comprising horizontal channeled bars, inflatable tubing secured to said bars, channeled ribs connecting said bars, a netting of flexible material covering said ribs and bent to fit the channels therein, and inflatable tubing secured in said bent portion of the netting, substantially as shown and described.

11. A car-fender comprising horizontal channeled bars, inflatable tubing secured to said bars, channeled ribs connecting said bars, a netting of flexible material covering said ribs and bent to fit the channels therein, and inflatable tubing secured in said bent portions of the netting, said inflatable tubing being connected together for simultaneous inflation, substantially as shown and described.

12. In combination with the platform of the car, and a fender secured thereto, brackets secured to said platform having swively-secured tubular bearings, horizontal rods secured to the fender and slidably mounted in said bearings, and coil-springs mounted on said rods, substantially as shown and described.

13. A car-fender formed of two sections mounted to swing independently of one another in a horizontal plane, and a fixed portion overlapping the adjacent ends of said swinging sections to bridge the opening therebetween, substantially as shown and described.

14. A car-fender formed of two independently-pivoted sections mounted to swing independently of one another in a horizontal plane, and a fixed portion overlapping the adjacent ends of said swinging sections to bridge the opening therebetween, substantially as shown and described.

15. In combination with a car having a platform, and a swinging truck, a fender consisting of two sections pivotally secured to the platform, and operative connections between the ends of the sections and the corresponding ends of the swinging truck, substantially as shown and described.

16. In combination with a car having a platform, and a swinging truck, a fender consisting of two sections pivotally secured to the platform, operative connections between the ends of the sections and the corresponding ends of the swinging truck, and spring-actuated means for holding the abutting ends of the sections together, substantially as shown and described.

17. In combination with a car having a platform, and a swinging truck, a rod secured to the platform and extending downwardly, a fender comprising two sections pivotally secured to the platform on each side of said rod and adapted to swing in horizontal planes, operative connections between the outer ends of said sections and the corresponding ends of the swinging truck, and springs connecting said rod and adjacent ends of said sections, substantially as shown and described.

18. In combination with a car having a platform, and a swinging truck, a rod secured to the platform and extending downwardly, a fender comprising two sections pivotally secured to the platform on each side of said rod and adapted to swing in horizontal planes, operative connections between the outer ends of said sections and the corresponding ends of the swinging truck, springs connecting said rod and the adjacent ends of said sections, horizontal rods secured to said sections, tubular bearings for said rods secured to the platform, and springs mounted on said rods and engaging against said tubular bearings, substantially as shown and described.

19. In combination with the platform of a car, a horizontal channeled bar secured thereto, an inflatable tube secured to said channeled bar, curved horizontal channeled bars, channeled ribs connecting said horizontal bars, inflatable tubes secured to said channeled ribs, brackets secured to said platform having tubular bearings, horizontal rods secured to said curved horizontal bars and slidably mounted in said tubular bearings, and coil-springs mounted on said rods, substantially as shown and described.

20. In combination with the platform of a car, a horizontal channeled bar secured thereto, an inflatable tube secured to said channeled bar, curved horizontal channeled bars, channeled ribs connecting said horizontal bars, inflatable tubes secured to said channeled ribs, said inflatable tubing being connected together for simultaneous inflation, brackets secured to said platform having tubular bearings, horizontal rods secured to said curved horizontal bars and slidably mounted in said tubular bearings, and coil-springs mounted on said rods, substantially as shown and described.

21. In combination with the platform of a car, a horizontal bar secured thereto, an inflatable tube secured to said bar, curved horizontal bars, inflatable tubes secured to said bar, ribs connecting said horizontal bars, a netting of flexible material covering said ribs, inflatable tubing secured over said ribs, brackets secured to the platform having tubular bearings, horizontal rods secured to said curved horizontal bars and slidably mounted in said tubular bearings, and coil-springs mounted on said rods, substantially as shown and described.

22. In combination with the platform of a car, a horizontal bar secured thereto, an inflatable tube secured to said bar, curved horizontal bars, inflatable tubes secured to said bar, ribs connecting said horizontal bars, a netting of flexible material covering said ribs, inflatable tubing secured over said ribs, all of the inflatable tubing being connected together for simultaneous inflation, brackets secured to the platform having tubular bearings, horizontal rods secured to said curved horizontal bars and slidably mounted in said tubular bearings, and coil-springs mounted on said rods, substantially as shown and described.

23. In combination with the platform of a car, a horizontal channeled bar secured thereto, an inflatable tube secured in the channel of said bar, curved horizontal channeled bars, inflatable tubes secured to said last-mentioned bars, channeled ribs connecting said horizontal channeled bars, a netting of flexible material covering said ribs, inflatable tubes secured over said ribs, brackets secured to said curved horizontal bars and slidably mounted in said tubular bearings, and coil-springs mounted on said rods, substantially as shown and described.

24. In combination with the platform of a car, a horizontal channeled bar secured thereto, an inflatable tube secured in the channel of said bar, curved horizontal channeled bars, inflatable tubes secured to said last-mentioned bars, channeled ribs connecting said horizontal channeled bars, a netting of flexible material covering said ribs, inflatable tubes secured over the said ribs, all of said tubing being connected together for simultaneous inflation, brackets secured to the platform having tubular bearings, horizontal rods secured to said curved horizontal bars and slidably mounted in said tubular bearings, and coil-springs mounted on said rods, substantially as shown and described.

25. In combination with a car having a platform, and a swinging truck, a channeled rod secured to said platform, a netting of flexible material secured to said rod, an inflatable tube secured over said netting, a fender comprising two sections pivotally secured to said platform on each side of said rod and mounted to swing in horizontal planes, each of said sections comprising horizontal channeled bars and channeled ribs secured to said bars, said netting being stretched over said bars and ribs, inflatable tubing secured over said bars and ribs and connected together and with the tube over the central rod for simultaneous inflation, and operative connections between the outer ends of said sections and the corresponding ends of said swinging truck, substantially as shown and described.

26. In combination with a car having a platform, and a swinging truck, a channeled rod secured to said platform, a netting of flexible material secured to said rod, an inflatable tube secured over said netting, a fender comprising two sections pivotally secured to said platform on each side of said rod and mounted to swing in horizontal planes, each of said sections comprising horizontal channeled bars and channeled ribs secured to said bars, said netting being stretched over said bars and ribs, inflatable tubing secured over said bars and ribs and connected together and with the inflatable tube over the central rod for simultaneous inflation, operative connections between the outer ends of said sections and the corresponding ends of said swinging truck, and spring-actuated means for holding the inner ends of the sections against the central rod, substantially as shown and described.

27. In combination with a car having a platform, and a swinging truck, a channeled rod secured to said platform, a netting of flexible material secured to said rod, an inflatable tube secured over said netting, a fender comprising two sections pivotally secured to said platform on each side of said rod and mounted to swing in horizontal planes, each of said sections comprising horizontal channeled bars and channeled ribs secured to said bars, said netting being stretched over said bars and ribs, inflatable tubing secured over said bars and ribs and connected together and with the inflatable tube over the central rod for simultaneous inflation, operative connections between the outer ends of said sections and the corresponding ends of said swinging truck, and springs secured to the central rod and the adjacent ends of said sections, substantially as shown and described.

28. In combination with a car having a platform and a swinging truck, a channeled rod secured to said platform, a netting of flexible material secured to said rod, an inflatable tube secured over said netting, a fender comprising two sections pivotally secured to said platform on each side of said rod and mounted to swing in horizontal planes, each of said sections comprising horizontal channeled ribs secured to horizontal channeled bars, said netting being stretched over said bars and ribs, inflatable tubing secured over said bars and ribs and connected together and with the inflatable tube over the central rod for simultaneous inflation, operative connections between the outer ends of said sections and the corresponding ends of said swinging truck, springs secured to the central rod and the adjacent ends of said sections, horizontal rods secured to said sections, tubular bearings secured to the platform to receive said rods, and springs mounted on said rods and engaging said bearings, substantially as shown and described.

29. In combination with a car having a platform, and a swinging truck, a channeled rod secured to said platform, a netting of flexible material secured to said rod, an inflatable tube secured to said rod, and over said netting, a fender comprising two sections pivotally secured to said platform on each side of said rod and mounted to swing in horizontal planes, each of said sections comprising horizontal channeled bars and channeled ribs secured to said bars, said netting being stretched over said bars and ribs, inflatable tubing secured over said bars and ribs and connected together and with the tube over the central rod for simultaneous inflation, chains secured to and connecting the outer ends of the sections and the corresponding ends of said truck, horizontal rods secured to said sections, tubular bearings secured to the platform to receive said rods, and springs mounted on said rods and engaging said bearings, substantially as shown and described.

30. In combination with a car having a platform, and a swinging truck, a channeled rod secured to said platform, a netting of flexible material secured to said rod, an inflatable tube secured over said netting, and a fender formed of two sections mounted to swing in a horizontal plane, substantially as shown and described.

31. In combination with a car having a platform, and a swinging truck, a channeled rod secured to said platform, a netting of flexible material secured to said rod, an inflatable tube having right-angle extensions at its lower end over said netting, and a fender formed of two sections mounted to swing in a horizontal plane, substantially as shown and described.

32. In combination with a car having swinging trucks, a car-fender formed of a plurality of sections mounted to swing independently of one another in a horizontal plane, and operative connections between said sections and the adjacent truck, substantially as shown and described.

33. In combination with a car having swinging trucks, a car-fender formed of two independently-pivoted sections mounted to swing in a horizontal plane, and flexible connections between each section and the corresponding end of the adjacent swinging truck, substantially as shown and described.

34. A car-fender formed of a plurality of sections mounted to swing independently of one another, and a fixed portion overlapping the adjacent ends of said swinging sections to bridge the opening therebetween, substantially as shown and described.

35. A car-fender formed of a plurality of sections independently mounted to swing independently of one another, and a fixed portion overlapping the adjacent ends of said swinging sections to bridge the opening therebetween, substantially as shown and described.

36. In a car-fender, a plurality of sections mounted to swing independently of one another, said sections being normally in close proximity of one another, and automatic means to return said sections to their normal position after separation, substantially as shown and described.

37. In a car-fender, a plurality of sections mounted to swing independently of one another on horizontal planes, said sections being normally in close proximity to one another, and automatic means to return said sections to their normal position after separation, substantially as shown and described.

38. In a car-fender, a plurality of sections mounted to swing independently of one another, said sections being normally in close proximity to one another, and retractile coil-springs secured to the adjacent ends of said sections to hold the sections in their normal position and return them thereto when swung apart, substantially as shown and described.

39. In a car-fender, a plurality of sections mounted to swing independently of one another on horizontal planes, said sections being normally in close proximity to one another, and retractile coil-springs secured to the adjacent ends of said sections to hold the sections in their normal position and return them thereto when swung apart, substantially as shown and described.

40. In a car-fender, a plurality of sections mounted to swing independently of one another, said sections being normally in close proximity to one another, a fixed portion overlapping the adjacent ends of said sections to bridge the opening therebetween, and retractile coil-springs secured to said fixed portion and to the adjacent ends of said swinging sections, substantially as shown and described.

41. In a car-fender, a plurality of sections mounted to swing independently of one another on horizontal planes, said sections being normally in close proximity to one another, a fixed portion overlapping the adjacent ends of said sections to bridge the opening therebetween, and retractile coil-springs secured to said fixed portion and to the adjacent ends of said swinging sections, substantially as shown and described.

In witness whereof I have hereunto set my hand in presence of two subscribing witnesses.

JOHN POST.

In presence of—
L. B. SOUTHERLAND,
H. C. TAPLIN.